United States Patent [19]
DeJager

[11] Patent Number: 5,172,275
[45] Date of Patent: Dec. 15, 1992

[54] APOCHROMATIC RELAY LENS SYSTEMS SUITABLE FOR USE IN A HIGH DEFINITION TELECINE APPARATUS

[75] Inventor: Donald DeJager, Rochester, N.Y.

[73] Assignee: Eastman Kodak Company, Rochester, N.Y.

[21] Appl. No.: 634,264

[22] Filed: Dec. 14, 1990

[51] Int. Cl.⁵ .............................................. G02B 9/64
[52] U.S. Cl. ...................................... 359/755; 359/754
[58] Field of Search ............... 359/754, 755, 756, 757, 359/760, 740

[56] References Cited

U.S. PATENT DOCUMENTS

| | | | |
|---|---|---|---|
| 2,896,506 | 7/1959 | Azuma | 350/466 |
| 3,883,228 | 5/1975 | Betensky | 350/423 |
| 4,349,249 | 9/1982 | Brixner et al. | 359/797 |
| 4,702,569 | 10/1987 | Mercado et al. | 350/479 |
| 4,704,011 | 11/1987 | Mercado | 350/467 |
| 4,767,199 | 8/1988 | Yamamoto et al. | 359/649 |

FOREIGN PATENT DOCUMENTS

| | | |
|---|---|---|
| 0276865 | 8/1988 | European Pat. Off. . |
| 0340647 | 11/1989 | European Pat. Off. . |
| 0416651 | 3/1991 | European Pat. Off. . |
| 2101785 | 8/1972 | Fed. Rep. of Germany . |
| 3120276 | 8/1982 | Fed. Rep. of Germany . |
| 2183865 | 6/1987 | United Kingdom . |

OTHER PUBLICATIONS

Article: entitled "The Design of Double Gauss Systems Using Digital Computers", by M. Kidger and C. G. Wynne, Mar. 1967, vol. 6, No. 3, Applied Optics.

Primary Examiner—Scott J. Sugarman
Attorney, Agent, or Firm—Svetlana Z. Short

[57] ABSTRACT

An apocromatic relay system suitable for use in a high definition telecine apparatus comprising two groups of lens components with approximate symmetry about an aperture stop, as in a basic double gauss configuration plus one or two additional lens components located at the front of the first group of lens components and/or at the rear of the second group.

31 Claims, 6 Drawing Sheets

APOCHROMATIC RELAY LENS SYSTEMS SUITABLE FOR USE IN A HIGH DEFINITION TELECINE APPARATUS

CROSS-REFERENCE TO RELATED APPLICATIONS

Reference is made to related U.S. patent applications: Ser. No. 373,309, entitled "Method and Apparatus for Generating a High Definition Electronic Signal From a Line Scan of Color Original", filed on Jun. 29, 1989 now U.S. Pat. No. 5,045,932 and Ser. No. 421,893, entitled "A Beam Splitter for Color Imaging Apparatus", filed on Oct. 16, 1989 now U.S. Pat. No. 5,002,365. All of these applications are assigned to the assignee of the present invention.

BACKGROUND OF THE INVENTION

Field of the Invention

This invention relates to optical lenses, and, more particularly, to relay lens systems which are suitable for use in high definition telecine film scanners, and which have apochromatic color correction.

Requirements for the Telecine Relay Lens

The purpose of the lens system used in a high definition telecine apparatus is to relay an image on motion picture film onto a system of linear array CCD detectors. Details of such an apparatus are fully described in the patent applications cross referenced above. Inasmuch as that telecine apparatus processes film at normal (real time) projection speeds, it requires a very fast lens system. Because this is a relay lens system, the lens system has to operate at finite conjugates.

Between the relay lens system and the CCD detectors there is a beam splitting prism, wherein one input beam is divided into two output beams: one such output beam goes to a high definition "detail" or "luminance" channel, using mostly green light (60%), some red light (30%) and a little blue light (10%). For example, the "detail" CCD detector can consist of a linear array of 1920 photosites, each 0.015 mm in length, for an overall length of 28.8 mm.

The other output beam from the beamsplitting prism is sent to a "color channel" which includes a system of three linear CCD arrays, side-by-side, and has red, green and blue strip dichroic filters in front of them; this is known as the "color channel." Each such CCD array consists of 960 photosites, each 0.030 mm in length, giving an overall length of 28.8 mm.

In the "color channel", the red, green and blue CCD arrays all lie in the same focal plane. In the "detail channel", the red, green and blue rays should ideally focus in one and the same focal plane. Furthermore, the size of the image must be the same in all three colors. Because of the above and other system requirements, the lens system has to be a very well corrected apochromat. These requirements, or characteristics, are more rigorous than those required of lenses which are used in many broadcast quality color TV cameras. This is explained in a prior art section as follows:

Description Relative to the Prior Art

Many broadcast quality color TV cameras use a beamsplitting prism which is located between the taking lens and the sensors, e.g., vidicon tubes. The beamsplitting prism outputs three beams, one for red, a second for green and a third for blue. In this type of system, it is not necessary for the lens to be color corrected to cause all three colors to focus at equal distances from the lens. Instead, the red, green and blue sensors can be located at different distances from the lens, so as to compensate for any axial focus shift between colors that are caused by the lens. If these sensors are vidicon tubes, then it is not even necessary that the three images be exactly the same size: the electric and magnetic fields within and surrounding each tube can be electronically adjusted to compensate for this condition.

R. I. Mercado U.S. Pat. No. 4,702,569 entitled "Color Corrected Petzval Lens Systems", issued on Oct. 27, 1987, describes several types of lens systems having apochromatic color correction, ranging from two element telescope objectives to ten element Petzval type photographic objectives. This patent gives a comprehensive list of published papers on the subject of apochromatic color correction. It also describes a novel way of choosing particular types of glasses which can be used to obtain apochromatic color correction.

By definition, an apochromatic lens system should be color corrected so that at least three wavelengths of light, emanating from an axial object point, will be focused at equal distances from the back surface of the lens. This should be the case, at least, for paraxial rays, and usually is also true for zonal and marginal rays in the pupil.

Some of the lens systems described in the above patent are corrected for more than three wavelengths, and such lens systems have been referred to as superachromats.

A typical double gauss lens system configuration normally uses 4 to 8 lens elements, arranged into two groups, the first group preceding an aperture stop, and the second group following the aperture stop. In each group, the inner components, adjacent to the aperture stop, are meniscus in shape, with their concave surfaces facing the aperture stop. Each such inner component typically is a single negative element, or a doublet, but sometimes it is a triplet. The inner component doublet or triplet will contain at least one positive and one negative element, which are cemented together. However, sometimes the positive lens element and the negative lens element are separated by a very small airspace that usually has a meniscus shape. In each group, the outer components, away from the aperture stop, may consist of a combination of one or two positive singlet elements, or a doublet comprised of a positive and a negative element.

While the double gauss configuration works very well for objects at infinity, it is also well suited for use at finite conjugates, at magnifications near unity. This is a result of its approximate symmetry about the central aperture stop.

An example of a double-Gauss lens system that has been well corrected for color is given in R. I. Mercado U.S. Pat. No. 4,704,011, entitled "Three-Glass Photographic Objective Color Corrected at Four Wavelengths" issued on Nov. 3, 1987. Marcado's lens system consists of 6 elements, and is optimized for an object located at infinity. The disclosed lens systems are true apochromats; that is, they are corrected for three wavelengths of light. These lens systems were analyzed for both on and off-axis performance. The analysis showed that the on-axis performance of the lens system is excellent, the axial color is corrected for at least three wavelengths; it thus fulfills the requirements for a true apochromat. However, at 3°, we already have more than a half wave of optical path difference. As the field angle increases to 6°, the performance deteriorates even further by field curvature and tangential coma. A lens system like this, although perhaps adequate for other applications (it was probably intended for use in a 35 mm camera), would be completely inadequate for use in the telecine apparatus. It has insufficient aperture for this particular application. It is not corrected for finite conjugates at magnifications near unity. There is too much field curvature and tangential coma. It would be undesirable to have the image structure vary so much over the field of view.

SUMMARY OF THE INVENTION

It is an object of the present invention to provide an improved lens system which is particularly suitable for use as a relay lens system in a high definition telecine film scanner. Another object of the present invention is to provide a high performance lens system which has an apochromatic color correction.

In accordance with the present invention, fast, high quality apochromatic lens systems were designed. The resulting lens system designs have excellent image quality over the entire required field of view and throughout a region of the spectrum extending from blue to red, making the lens systems suitable for use in a high definition television film scanner apparatus.

The four illustrative embodiments are characterized as modified or enhanced double gauss types. They each comprise two groups of lens components, with approximate symmetry about an aperture stop, as in a basic double gauss configuration; plus one or two additional cemented or uncemented lens components, located at the front of the first group of lens components and/or at the rear of the second group. This/these additional lens components each comprise at least two elements made of glass types having a substantial difference in refractive index. As the illustrative embodiments show, this/these additional lens components each comprise at least a positive element and a negative element which are closely adjacent to each other. Furthermore, it is the negative element that is made from an optical material which has a considerably higher index of refraction than that for the positive element, and the interface between the two elements of the component is negative in optical power.

In the case of an airspace interface between the two elements, the optical Power of the interface is defined by:

$$Optical\ power = [(1-N1)/R1] + [(N2-1)/R2],$$

In the case of a cemented interface, (as is found in illustrative embodiments one, two and three), we set R1=R2 in the above formula for optical power, and the formula reduces to $$Optical\ power = (N2-N1)/R2,$$

where
  N1 is the refractive index of the glass to the left of the interface
  N2 is the refractive index of the glass to the right of the interface
  R1 is the radius of curvature of the surface on the left side
  R2 is the radius of curvature of the surface on the right side.

The radius of curvature, R1 or R2, is positive when the center of curvature lies to the right of the surface, and is negative when the center of curvature lies to the left of the surface. This is the standard convention used today in most lens computations.

According to a preferred embodiment the difference in refractive index of the aforesaid additional lens components is in excess of 0.10 with best performance when it is 0.15 or higher. As will be shown in the following preferred examples, the difference in refractive index ($\Delta N$) of the preferred examples is in the range $0.14 < N < 0.31$.

According to a preferred embodiment, the elements made of the higher index type of glass are physically located towards the outside (front or rear) of the lens.

These additional lens components mainly perform the function of helping to correct third order astigmatism, fifth order elliptical coma and oblique spherical. Of course, they also have an appreciable effect on all the other aberrations such as third order spherical, tangential coma, field curvature, distortion and the color aberrations. Their overall effect is to provide a design configuration for a lens system which is considerably superior in optical imaging performance, over the entire field of view, to that of the basic double-Gauss configuration.

The essential aspects of the invention are as described above. However, in addition, each of the four embodiments make extensive use of glasses that have abnormal relative partial dispersions, so that the color correction is highly superior to that which could have been obtained using more normal glass types; in fact, each embodiment has apochromatic color correction, as is more fully discussed in the detailed descriptions given below.

DETAILED DESCRIPTION OF THE PREFERRED EMBODIMENTS

Figure 1:
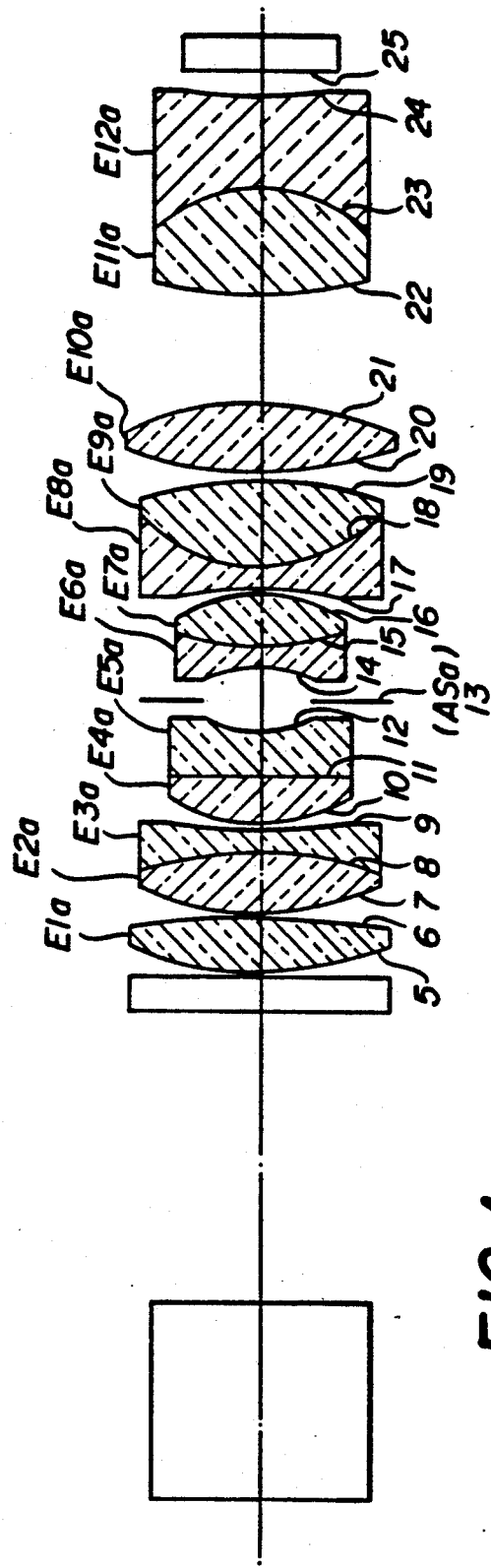
FIG. 1 is a sectional drawing of a first illustrative embodiment.

FIGS. 1, 2, 3, and 4 illustrate respectively first, second, third and the fourth illustrative embodiments of the present invention. Tables 1, 2, 3 and 4 give various parameters for the first, second, third, and the fourth illustrative embodiments, respectively, including the radii of the surfaces of the lens elements, thicknesses of the lens elements, and distances between the lens elements.

TABLE 1

| SURFACE NO. | RADIUS (mm) | THICKNESS (mm) | GLASS TYPE (BLANK = AIR) | CATALOG | NAME |
|---|---|---|---|---|---|
| OBJECT | INFINITY | 30.00 | | | |
| 1 | INFINITY | 34.00 | 517642 | BK7 | (SCHOTT) |
| 2 | INFINITY | 49.56 | | | |
| 3 | INFINITY | 6.00 | 517642 | BK7 | (SCHOTT) |
| 4 | INFINITY | 1.00 | | | |
| 5 | 65.1231 | 9.11 | 586610 | LGSK2 | (SCHOTT)* |
| 6 | −153.0320 | 0.90 | | | |
| 7 | 51.9944 | 10.43 | 586610 | LGSK2 | (SCHOTT)* |
| 8 | −67.5236 | 4.05 | 613443 | KZFSN4 | (SCHOTT)* |
| 9 | 126.8860 | 0.90 | | | |
| 10 | 29.9767 | 8.47 | 487845 | FK51 | (SCHOTT)* |
| 11 | −161.9230 | 6.71 | 682482 | LAF20 | (SCHOTT) |
| 12 | 17.0410 | 5.91 | | | |
| 13 | (APERTURE STOP) | 5.91 | | | |
| 14 | −18.9197 | 3.00 | 613443 | KZFSN4 | (SCHOTT)* |
| 15 | 45.7245 | 9.07 | 586610 | LGSK2 | (SCHOTT)* |
| 16 | −28.3964 | 0.94 | | | |
| 17 | −78.6332 | 4.00 | 613443 | KZFSN4 | (SCHOTT)* |
| 18 | 30.3167 | 14.88 | 586610 | LGSK2 | (SCHOTT)* |
| 19 | −62.5651 | 0.98 | | | |
| 20 | 71.9300 | 11.72 | 586610 | LGSK2 | (SCHOTT)* |
| 21 | −56.7590 | 19.04 | | | |
| 22 | 77.1517 | 18.55 | 547536 | BALF5 | (SCHOTT) |
| 23 | −26.8715 | 16.87 | 720504 | LAK10 | (SCHOTT)* |
| 24 | 82.2018 | 5.00 | | | |
| 25 | INFINITY | 8.00 | 517642 | BK7 | (SCHOTT) |
| 26 | INFINITY | 15.00 | | | |
| IMAGE | INFINITY | 0.00 | | | |

*Glasses with abnormal relative partial dispersions

TABLE 2

| SURFACE NO. | RADIUS (mm) | THICKNESS (mm) | GLASS TYPE (BLANK = AIR) | CATALOG | NAME |
|---|---|---|---|---|---|
| Object | INFINITY | 30.00 | | | |
| 1 | INFINITY | 29.05 | 517642 | BK7 | (SCHOTT) |
| 2 | INFINITY | 48.58 | | | |
| 3 | INFINITY | 4.00 | 517642 | BK7 | (SCHOTT) |
| 4 | INFINITY | 6.00 | | | |
| 5 | −37.5865 | 5.00 | 654396 | KZFSN5 | (SCHOTT)* |
| 6 | 80.1994 | 9.88 | 501564 | K10 | (SCHOTT) |
| 7 | −51.1244 | 1.00 | | | |
| 8 | 103.021 | 8.70 | 586610 | LGSK2 | (SCHOTT)* |
| 9 | −76.5635 | 1.33 | | | |
| 10 | 56.9611 | 10.05 | 586610 | LGSK2 | (SCHOTT)* |
| 11 | 117.738 | 1.00 | | | |
| 12 | 47.9976 | 7.83 | 487845 | FK51 | (SCHOTT)* |
| 13 | −77.4080 | 1.43 | | | |
| 14 | −72.1304 | 9.87 | 558542 | KZFSN2 | (SCHOTT)* |
| 15 | 28.3067 | 2.86 | | | |
| 16 | (APERTURE STOP) | 2.86 | | | |
| 17 | −28.3067 | 9.87 | 558542 | KZFSN2 | (SCHOTT)* |
| 18 | 72.1304 | 1.43 | | | |
| 19 | 77.4080 | 7.83 | 487845 | FK51 | (SCHOTT)* |
| 20 | −47.9976 | 1.00 | | | |
| 21 | −148.567 | 5.56 | 586610 | LGSK2 | (SCHOTT)* |
| 22 | −59.4914 | 1.11 | | | |
| 23 | 71.0150 | 12.71 | 586610 | LGSK2 | (SCHOTT)* |
| 24 | −111.360 | 7.50 | | | |
| 25 | 43.2192 | 10.00 | 501564 | K10 | (SCHOTT) |
| 26 | −66.2266 | 9.16 | 654396 | KZFSN5 | (SCHOTT)* |
| 27 | 31.7598 | 6.00 | | | |
| 28 | INFINITY | 4.00 | 517642 | BK7 | (SCHOTT) |
| 29 | INFINITY | 44.40 | | | |
| IMAGE | INFINITY | 0.00 | | | |

*Glasses with abnormal relative partial dispersions

TABLE 3

| SURFACE NO. | RADIUS (mm) | THICKNESS (mm) | GLASS TYPE (BLANK = AIR) | CATALOG | NAME |
|---|---|---|---|---|---|
| Object | INFINITY | 30.00 | | | |
| 1 | INFINITY | 29.05 | 517642 | BK7 | (SCHOTT) |
| 2 | INFINITY | 45.92 | | | |
| 3 | INFINITY | 4.00 | 517642 | BK7 | (SCHOTT) |
| 4 | INFINITY | 6.00 | | | |
| 5 | −42.2210 | 9.93 | 788474 | LASF014 | (OHARA)* |
| 6 | 59.9993 | 11.11 | 586610 | LGSK2 | (SCHOTT)* |
| 7 | −58.3798 | 0.50 | | | |
| 8 | 62.1033 | 10.20 | 586610 | LGSK2 | (SCHOTT)* |
| 9 | −79.8413 | 0.53 | | | |
| 10 | 73.2211 | 5.40 | 586610 | LGSK2 | (SCHOTT)* |
| 11 | 141.494 | 0.50 | | | |
| 12 | 31.2365 | 9.98 | 487845 | FK51 | (SCHOTT)* |
| 13 | −137.290 | 6.33 | 734515 | LAK09 | (OHARA)* |
| 14 | 25.2015 | 5.16 | | | |
| 15 | (APERTURE STOP) | 5.16 | | | |
| 16 | −25.2015 | 6.33 | 734515 | LAK09 | (OHARA)* |
| 17 | 137.290 | 9.98 | 487845 | FK51 | (SCHOTT)* |
| 18 | −31.2365 | 0.50 | | | |
| 19 | −1117.00 | 5.73 | 586610 | LGSK2 | (SCHOTT)* |
| 20 | −92.1109 | 0.50 | | | |
| 21 | 58.8936 | 9.64 | 586610 | LGSK2 | (SCHOTT) |
| 22 | −79.8413 | 4.85 | | | |
| 23 | 50.6343 | 10.71 | 586610 | LGSK2 | (SCHOTT)* |
| 24 | −48.0574 | 15.00 | 788474 | LASF014 | (OHARA)* |
| 25 | 32.2625 | 6.00 | | | |
| 26 | INFINITY | 4.00 | 517642 | BK7 | (SCHOTT) |
| 27 | INFINITY | 46.98 | | | |
| Image | INFINITY | 0.00 | | | |

*Glasses with abnormal relative partial dispersion

TABLE 4

| SURFACE NO. | RADIUS (mm) | THICKNESS (mm) | GLASS TYPE (BLANK = AIR) | CATALOG | NAME |
|---|---|---|---|---|---|
| OBJECT | INFINITY | 30.00 | | | |
| 1 | INFINITY | 29.05 | 517642 | BK7 | (SCHOTT) |
| 2 | INFINITY | 32.83 | | | |
| 3 | INFINITY | 4.00 | 517642 | BK7 | (SCHOTT) |
| 4 | INFINITY | 6.00 | | | |
| 5 | −60.56270 | 15.00 | 881410 | LASFN31 | (SCHOTT)* |
| 6 | 115.88460 | 1.00 | | | |
| 7 | 107.93970 | 10.96 | 586610 | LGSK2 | (SCHOTT)* |
| 8 | −65.77260 | 1.00 | | | |
| 9 | 138.93100 | 12.32 | 586610 | LGSK2 | (SCHOTT)* |
| 10 | −138.93100 | 1.00 | | | |
| 11 | 73.23340 | 6.92 | 586610 | LGSK2 | (SCHOTT)* |
| 12 | 311.93580 | 5.55 | | | |
| 13 | 35.45850 | 10.09 | 487845 | FK51 | (SCHOTT)* |
| 14 | −94.92920 | 1.01 | | | |
| 15 | −90.98260 | 5.62 | 558542 | KZFSN2 | (SCHOTT)* |
| 16 | 26.54090 | 4.61 | | | |
| 17 | (APERTURE STOP) | 4.40 | | | |
| 18 | −28.51400 | 7.96 | 558542 | KZFSN2 | (SCHOTT)* |
| 19 | 82.35970 | 1.50 | | | |
| 20 | 90.75350 | 10.05 | 487845 | FK51 | (SCHOTT)* |
| 21 | −38.22780 | 5.06 | | | |
| 22 | 875.95620 | 7.18 | 586610 | LGSK2 | (SCHOTT)* |
| 23 | −87.34010 | 1.00 | | | |
| 24 | 74.72870 | 8.07 | 586610 | LGSK2 | (SCHOTT)* |
| 25 | −268.60470 | 1.00 | | | |
| 26 | 41.07060 | 9.59 | 586610 | LGSK2 | (SCHOTT)* |
| 27 | −203.60640 | 1.00 | | | |
| 28 | −256.90180 | 11.36 | 881410 | LASFN31 | (SCHOTT)* |
| 29 | 29.09140 | 6.00 | | | |
| 30 | INFINITY | 4.00 | 517642 | BK7 | (SCHOTT) |
| 31 | INFINITY | 44.884 | | | |
| IMAGE | INFINITY | 0.00 | | | |

*Glasses with abnormal relative partial dispersion

The first illustrative embodiment shown in FIG. 1 has fabrication data as given in Table 1. The first illustrative embodiment comprises lens elements or lens components arranged in sequential order from left-to-right as follows:

a first lens component which is a biconvex singlet lens element (E1a), made of Schott LGSK2, or a similar material;

a first cemented doublet component that consists of a biconvex lens element (E2a) cemented to a biconcave lens element (E3a), these elements made from Schott LGSK2 and Schott KAFSN4, respectively;

a second cemented doublet component that consists of a positive biconvex lens element (E4a) and a negative biconcave lens element (E5a) made of Schott FK51 and Schott LAF20 glasses;

an aperture stop (ASa);

a third cemented doublet component made of Schott KAFSN4 and Schott LGSK2 glasses and consisting of a negative biconcave lens element (E6a) cemented to a positive biconvex lens element (E7a);

a fourth cemented doublet component also made from Schott KAFSN4 and Schott LGSK2 glasses and also consisting of a negative biconcave lens element (E8a) and a positive biconvex lens element (E9a);

a biconvex lens component which is a singlet lens element (E10a) made of Schott LGSK2 glass; and a cemented doublet lens component, that consists of a biconvex lens element E(11a) and a negative biconcave lens element E(12a), made of Schott BALF5 and Schott LAK10 glasses.

The two glasses BALF5 and LAK10 for lens elements E11a and E12a have a refractive index difference of about 0.17, and the optical power of the cemented interface is −0.00642.

Figure 2:
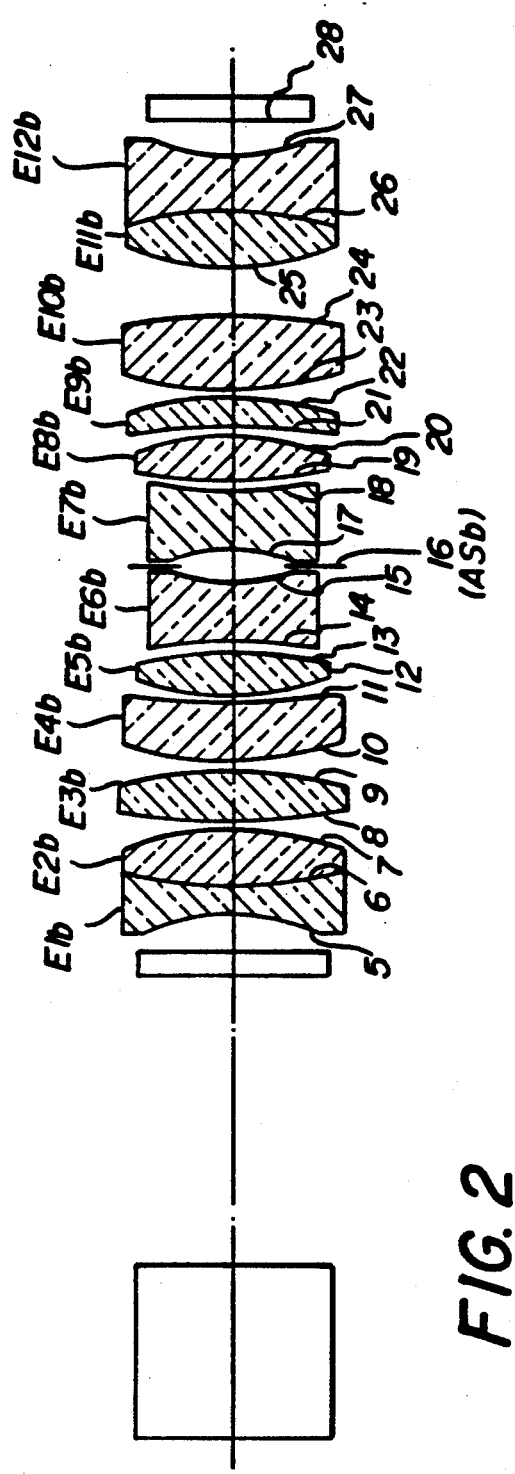
FIG. 2 is a sectional drawing of a second illustrative embodiment.

The second illustrative embodiment shown in FIG. 2 has fabrication data as given in Table 2. The lens system of the second embodiment consists of lens elements, lens components and glass types as follows:

a first cemented doublet, made of Schott KZFSN5 and Schott K10 glasses, this doublet consists of a biconcave negative lens element (E1b) and a biconvex positive lens element (E2b);

a biconvex lens component which is a positive singlet lens element, (E3b) made of Schott LGSK2;

a meniscus lens component which is a singlet lens element (E4b) made of Schott LGSK2;

a biconvex lens component which is a single lens element (E5b) made of Schott FK51;

a biconcave lens component which is a single lens element (E6b) made of Schott KZFSN2;

an Aperture stop (ASb)

a biconcave lens component which is a single lens element (E7b) made of Schott KZFSN2;

a biconvex lens component which is a single lens element (E8b) made of Schott FK51;

a meniscus lens component which is a single lens element (E9b) made of Schott LGSK2;

a biconvex lens component which is a single lens element (E10b) made of Schott LGSK2;

a cemented doublet consisting of a biconvex positive lens element (E11b) cemented to a biconcave negative lens element (E12b) made of Schott K10 and Schott KZFSN5 glasses, respectively.

The two glasses K10 and KZFSN5 have a refractive index difference of about 0.15, and the optical power of the cemented interface is: −0.0019 and −0.00231 for the front and the rear interfaces respectively. The optical powers were calculated by using the following equation:

$$\text{Optical power} = (N2 - N1)/R2,$$

for example the rear interface optical power is:

$$\frac{1.65412 - 1.50137}{-66.2266} = -.0023$$

Figure 3:
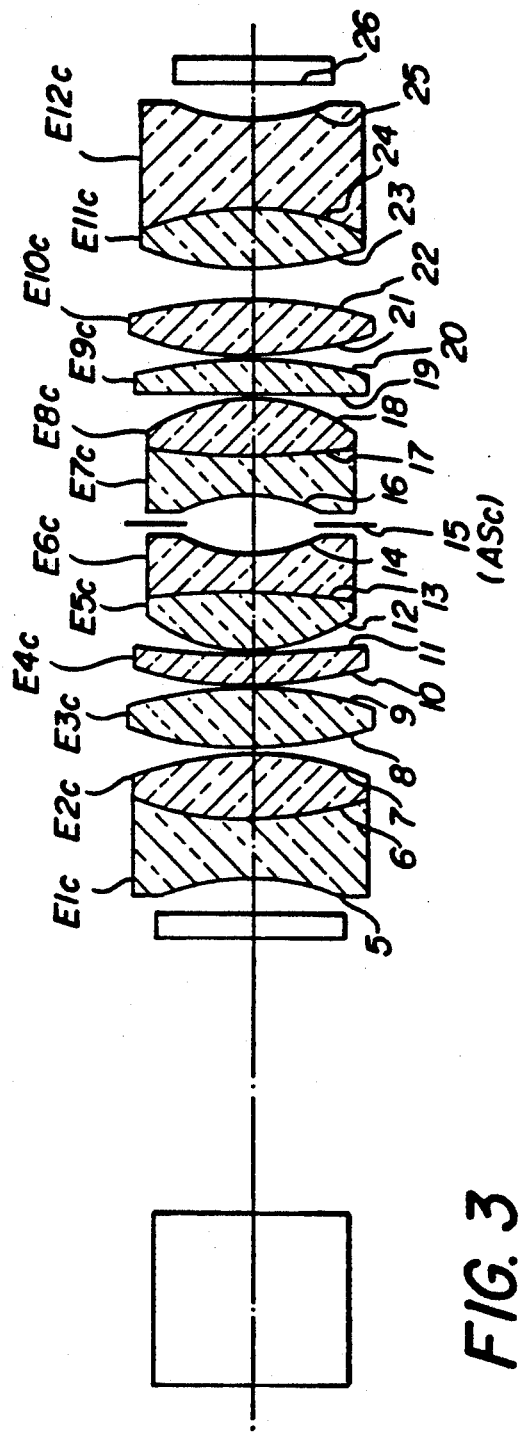
FIG. 3 is a sectional drawing of a third illustrative embodiment.

The lens design shown in FIG. 3 has fabrication data as given in Table 3. This illustrative embodiment consists of lens elements, lens components and glass types as follows:

a first cemented doublet, consisting of a negative biconvex lens (E1c) element cemented to a positive biconvex lens element (E2c) and made of Ohara LASF014 and Schott LGSK2 glasses;

biconvex lens component, which is a single lens element (E3c) made of Schott LGSK2;

meniscus lens component, which is a single lens element (E4c) made of Schott LGSK2;

second cemented doublet consisting of a positive biconvex lens element (E5c) cemented to a negative biconcave lens element (E6c) made of Schott FK51 and Ohara LAK09 glasses respectively;

an Aperture stop (ASc)

third cemented doublet, consisting of a negative biconcave lens element (E7c) cemented to a positive biconvex lens element (E8c) made of Ohara LAK09 and Schott FK51 glasses respectively;

a meniscus lens component which is a single lens element (E9c) made of Schott LGSK2 biconvex lens component which is a single lens element (E10c) made of Schott LGSK2; and fourth cemented doublet, consisting of a positive biconvex lens element (E11c) cemented to a negative biconcave lens element (E12c) made of Schott LGSK2 and Ohara LASF014 glasses respectively.

The two glasses LGSK2 and LASF014 have a refractive index difference of about 0.20, and the optical power of the cemented interface is −0.00337 and −0.00420 for the front and the rear interfaces respectively.

Figure 4:
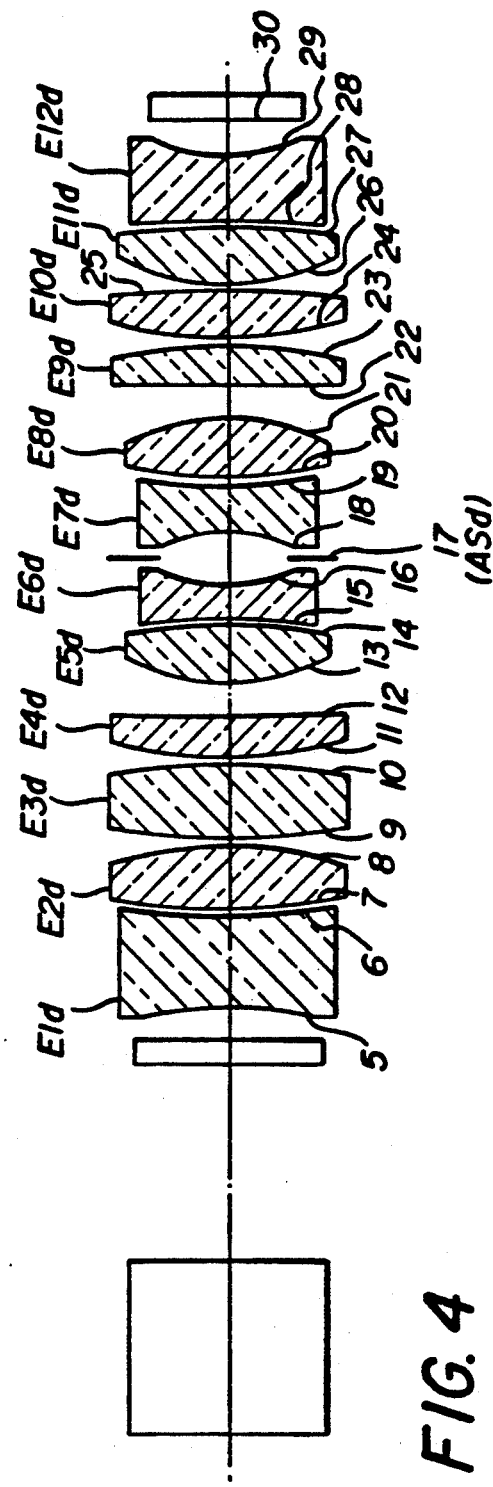
FIG. 4 is a sectional drawing of a fourth illustrative embodiment.

The lens shown in FIG. 4 has fabrication data as given in TABLE 4. This illustrative embodiment consists of lens elements, lens components and glass types as follows:

a first uncemented doublet, consisting of a negative biconvex lens (E1d) element closely adjacent to a positive biconvex lens element (E2d) and made of Schott LASFN31 and LGSK2 glasses respectively, a biconvex lens component, which is a single lens element (E3d) made of Schott LGSK2;

a meniscus lens component, which is a single lens element (E4d) made of Schott LGSK2;

a second uncemented doublet consisting of a positive biconvex lens element (E5d) closely adjacent to a negative biconcave lens element (E6d) made of Schott FK51 and Schott KZFSN2 glasses respectively;

n Aperture stop (ASd)

a third uncemented doublet, consisting of a negative biconcave lens element (E7d) closely adjacent to a positive biconvex lens element (E8d) made of Schott KZFSN2 and Schott FK51 glasses respectively;

biconvex lens component which is a single lens element (E9d) made of Schott LGSK2;

biconvex lens component which is a single lens element (E10d) made of Schott LGSK2; and a fourth uncemented doublet, consisting of a positive biconvex lens element (E11d) closely adjacent to a negative biconcave lens element (E12d) made of Schott LGSK2 and Schott LASFN31 glasses respectively.

The two glasses LGSK2 and LASFN31 comprising the first and fourth doublets have a refractive index difference of about 0.3. The optical power for the front and the rear interfaces is −0.00217 and −0.00055. The optical power for the uncemented interface is calculated by the following equation $$\text{Optical power} = [(1-N1)/R] + [(N2-1)/R2]$$

For example, the optical power of the rear interface is:

$$\text{Optical power} = \left[\frac{1-1.58599}{-203.6064}\right] + \left[\frac{1.88067-1}{-256.9018}\right] = -.00055$$

The distance from the object plane to the image plane, also known as the track length, is a very important lens system parameter, because it determines the scale size of the lens system, which in turn determines the size of the lens aberrations. For example, the secondary axial color of a lens system is proportional to the product of the track length and the magnification at which the lens system is operating. The illustrative embodiments described herein were all designed for a 300 mm track length, approximately.

The size of the object and of the image determine the magnification at which the lens system must operate, and also the angular field of view of the lens system. In our case, we have a line of imagery on 35 mm motion picture film which is 20.96 mm long, which must be relayed to a linear array CCD sensor which is 28.8 mm long; thus the required magnification is 1.374. The angular field of view is taken with respect to the optical center of the lens system, splitting the 300 mm track length into two sections of length 126.367 mm and 173.633 mm. The angular field of view is +/−4.74 degrees, with respect to the optical center of the lens system.

It is customary to design and test a lens system with the "object" at the long conjugate, on the left side of the lens system, and the "image" at the short conjugate, on the right side of the lens. All rays are traced from left-to-right, which in this case is in a direction opposite to that at which the light is actually traveling. Thus, the magnification for which we design the lens system is the reciprocal of 1.374, or 0.7278. This reversal of direction occurs most commonly in the design of a lens system for a projection apparatus: the light actually travels from the short conjugate (the film) to the long conjugate (the projection screen), but the lens is always designed for rays traveling in the opposite direction. The design details for the lens system in the illustrative embodiments described in this patent application are given in the order used in the design process, i.e. for rays traveling from an "object" at the left to an "image" at the right, with the "object" at the CCD and the "image" at the motion picture film.

The "speed" or aperture of the lens systems disclosed in the embodiments of the invention are as given in the following table:

| Embodiment | Numerical Aperture at Object (CCD) | Numerical Aperture at Image (film) | ANSI f-No. of lens |
|---|---|---|---|
| 1st illustrative embodiment | 0.1250 | 0.17175 | 1.685 |
| 2nd illustrative embodiment | 0.1000 | 0.13740 | 2.106 |
| 3rd illustrative embodiment | 0.1087 | 0.14935 | 1.938 |
| 4th illustrative embodiment | 0.1087 | 0.14935 | 1.938 |

Note: The American National Standards Institute formula for the f-number of a lens, which operates at finite conjugates, is the reciprocal of twice the sum of the numerical apertures on the two sides of the lens system.

These f-numbers are unusually low (i.e., the lenses are unusually "fast") for lens systems having apochromatic color correction. With the exception made for apochromatic microscope objectives, the great majority of apochromatic lens systems have f-numbers in the range from 2.8 to 11. Thus, the high "speed" of lens systems described herein is one of their notable characteristics.

These unusually large numerical apertures were dictated by the need for the telecine apparatus to process film at normal (real time) projection speeds. Even using a highly optimized illumination system, there would have been a shortage of photons to drive the CCD sensors if the lenses had been more than one stop slower.

One of the requirements of the lens system is that of open gate uniformity in illumination. Assuming no film is in the gate, all of the individual photosites should ideally receive the same number of photons, within a tolerance of +/−5%. In order to satisfy this need, the lens design cannot permit any pupil vignetting in oblique beams.

It is the numerical apertures on the object side of the lens systems which determine the size of the Airy disc diffraction spot at the CCD sensors. These diffraction spot diameters are given by the formula:

$$\text{Diffraction spot diameter} = 1.22\ (WL)/(NA)$$

where WL=wavelength and NA=numerical aperture. At a wavelength of 0.55 micrometers, the diffraction spot diameters would be as follows:

1st illustrative embodiment: 5.4 micrometers
2nd illustrative embodiment: 6.7 micrometers
3rd illustrative embodiment: 6.2 micrometers
4th illustrative embodiment: 6.2 micrometers These theoretical spot diameters are considerably smaller than the CCD photosites, which are 15 micrometers at the detail sensor. Thus, it is not a requirement that these lens systems perform as perfect diffraction limited lenses at their full apertures. If the requirement on image quality is that the image spot diameters at a CCD sensor are to be less than 15 micrometers, then there will be a small but useful depth of focus. On the CCD (object) side of the lens systems, the depth of focus may be taken as +/−0.055 mm, as a working tolerance. On the film (image) side of the lens, this tolerance translates into about +/−0.03 mm.

The axial color characteristics of each of the four examples are shown in FIGS. 1a, 2a, 3a, and 4a. Each Figure shows a plot of the relative longitudinal focus position for rays which are traced through the lens, starting at the axial object position (where the CCD's are located) and ending in the vicinity of the axial image position (where the film is located). Three types of rays are traced: paraxial rays, zonal rays passing through the 0.7 zone of the pupil, and marginal rays, passing through the edge of the pupil, and also the edge of the aperture stop. These rays are traced at wavelengths varying from 400 nm is 850 nm. In each case the focus position for the paraxial rays at 550 nm is arbitrarily labeled zero. Thus, the focal positions at other wavelengths are all taken relative to the paraxial focal position at 550 nm.

These axial color plots reveal whether or not you have an apochromat. If you can draw a straight horizontal line, representing one particular focus position, which intersects the paraxial curves at 3 points, representing 3 wavelengths, then you have an apochromat. The identity of these 3 wavelengths will depend, of course, on the particular focal position that you chose. Since this was somewhat arbitrary, the particular three wavelengths that are represented by the three points are not important.

What is important is the amount of focus shift you have between the green at 550 nm and the red at about 670 nm, and also how much focus shift you have between the green at 550 nm and the blue at about 450 nm. These focus shifts will translate directly into lost imaging performance. Since the "detail" sensor relative sensitivity is only about 10% to the blue light, but is three times as strong to the red light, it is obvious that the focus shift between the green and the red rays is more important than is the focus shift between the green and the blue rays. As was mentioned previously, the focal depth on the image side of the lens system is about $+/-0.03$ mm. Examination of the axial color curves, shown in FIGS. 1a, 2a, 3a, and 4a, show that the amount of focus shift between the green and red rays is well within this focal depth. In FIGS. 1a, 2a, 3a, and 4a, it will be observed that the curves for paraxial, zonal and marginal rays are approximately "parallel" to each other, over most of the range encompassing the visible region of the spectrum. In this type of behavior, the spherical aberration does not vary appreciably with wavelength. The term "spherochromatism" refers to the variation of spherical aberration with wavelength; so in these cases we would say that the design is relatively free of spherochromatism, except near the blue end of the visible spectrum.

Figure 1A:
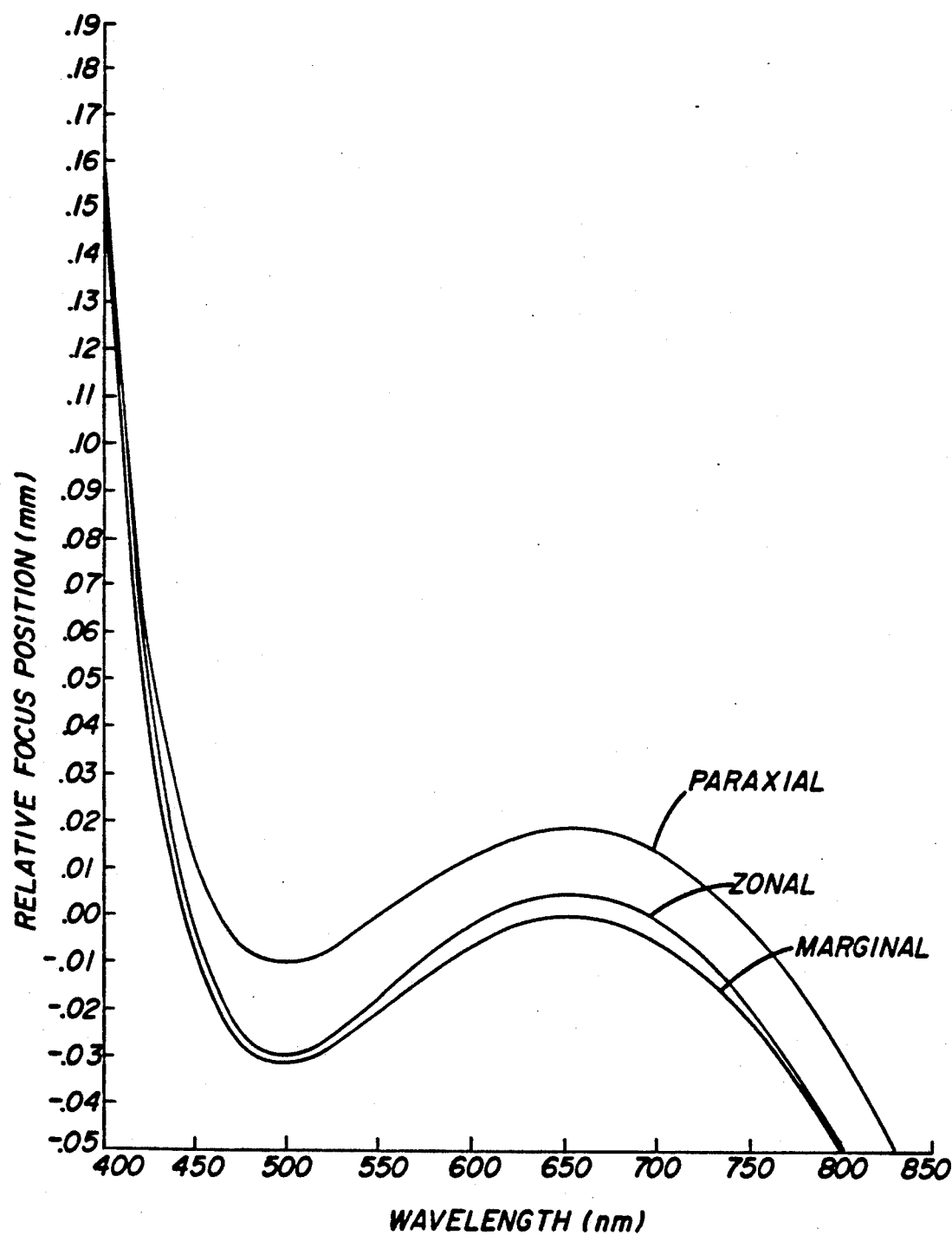
FIG. 1a is a plot of the axial color for the axial beam passing through the lens of the first illustrative embodiment.
Figure 2A:
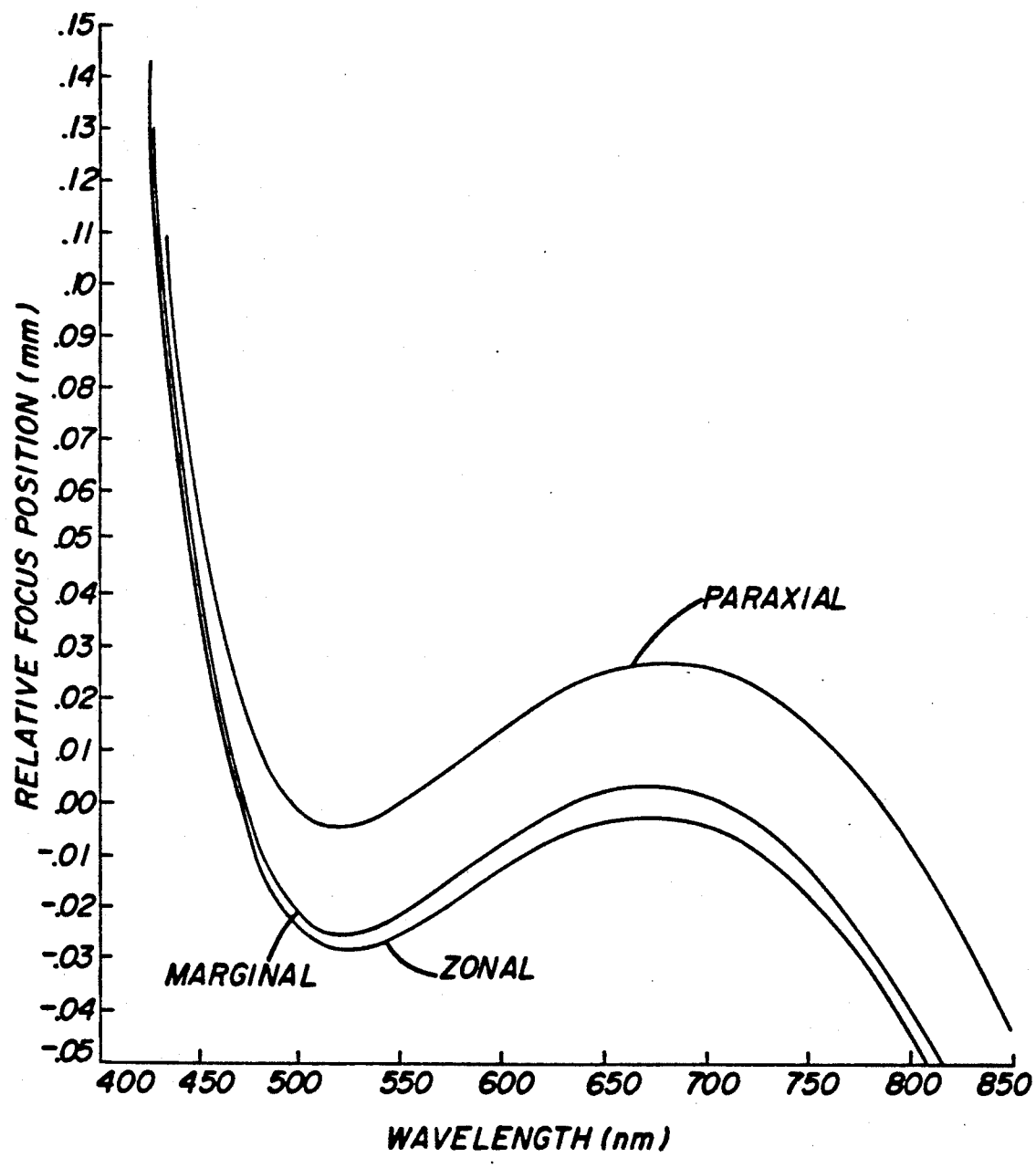
FIG. 2a is a plot of the axial color for the axial beam passing through the lens of the second illustrative embodiment.
Figure 3A:
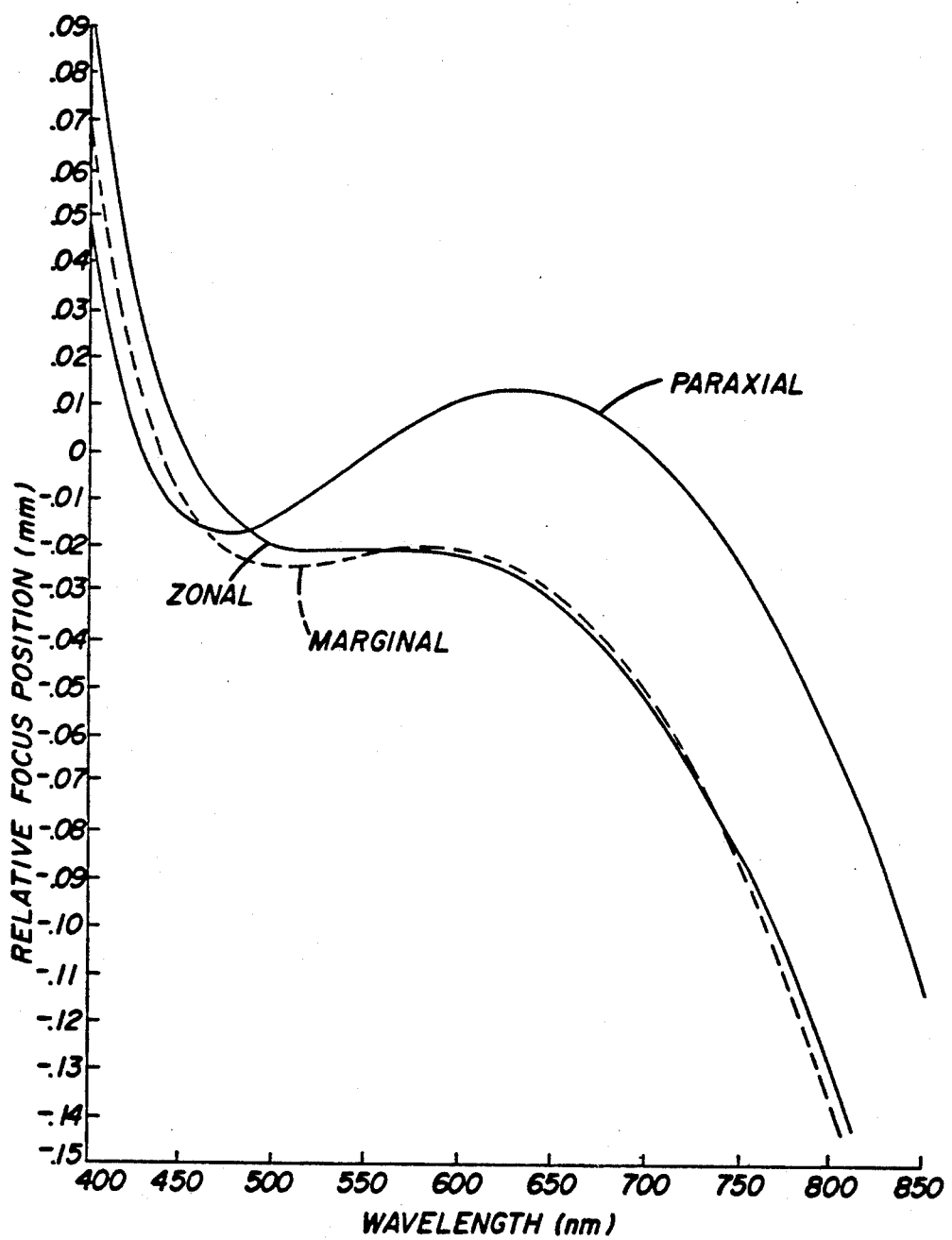
FIG. 3a is a plot of the axial color for the axial beam passing through the lens of the third illustrative embodiment.
Figure 4A:
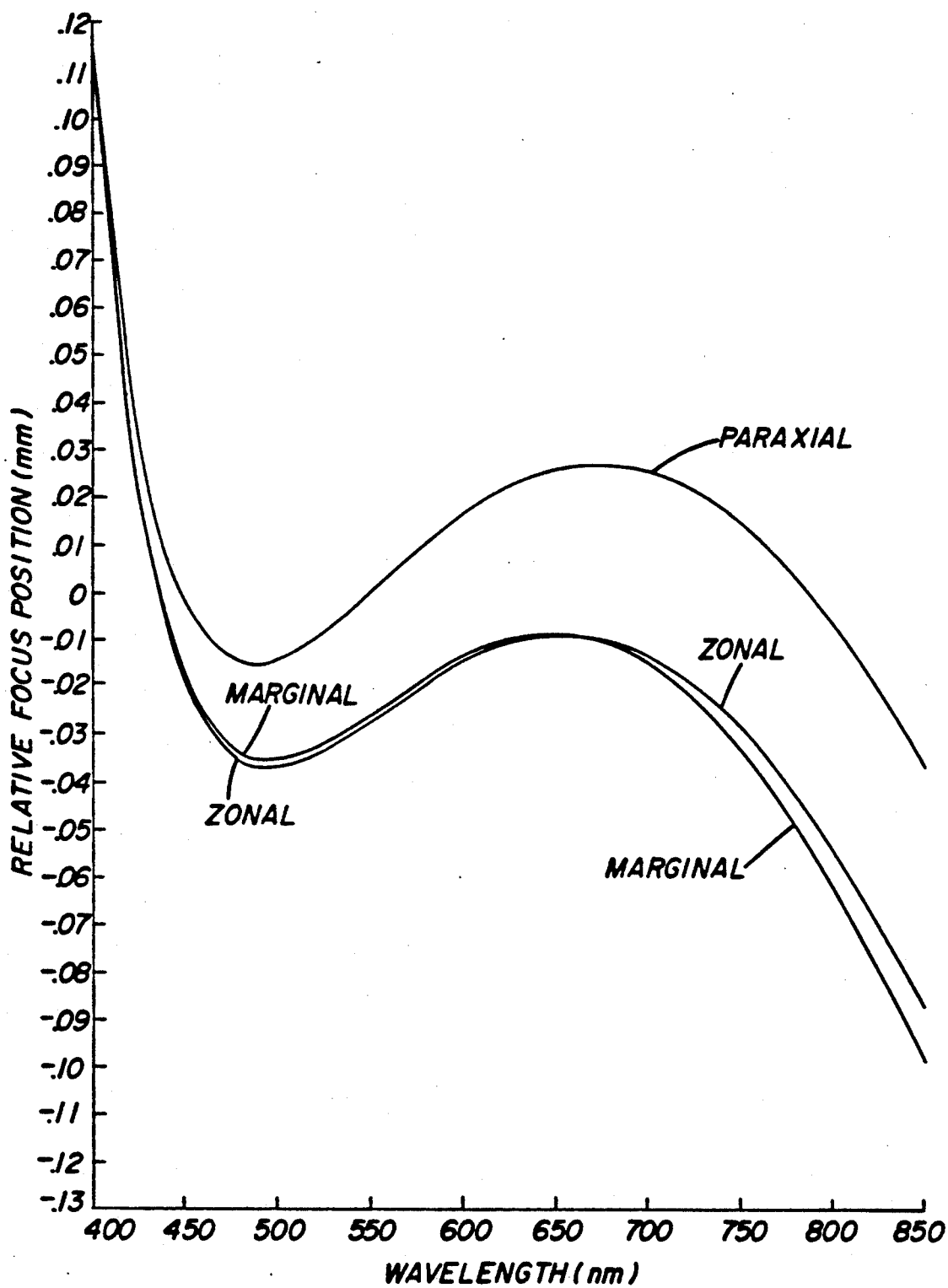
FIG. 4a is a plot of the axial color for the axial beam passing through the lens of the fourth illustrative embodiment.

In FIG. 3a, it will be observed that the zonal and marginal curves are not running "parallel" with the paraxial curve. At 670 nm, the lens design is spherically undercorrected, and at 450 nm, the design is spherically overcorrected. Thus, there is some spherochromatism present in this design. The type of behavior shown in FIGS. 1a, 2a and 4a is generally to be preferred to that shown in FIG. 3a. Even so, the behavior shown in FIG. 3a is still quite acceptable, when its performance is analyzed in detail. In fact, if the deep blue region of the spectrum (450 nm) had been very important to the performance of the lens system, the type of performance shown in FIG. 3a would be preferred to that shown in FIG. 2a, because the focus shift between 450 nm and 550 nm is less in FIG. 3a than in FIG. 2a.

The embodiments shown in FIGS. 1, 2, 3, and 4 were designed for use in a high definition telecine apparatus. Because of the intended application, they have a thick block of glass on the front, or object side of the lens. This block of glass, having two plano surfaces, represents the glass used in the beamsplitter prism, plus various color filters.

Each of the four examplary lenses also have plano plate windows at the front and rear. These windows provide protection to the lens elements; they are made out of the common crown glass BK7. The windows are easily cleaned and can be replaced if they become damaged for any reason. When we refer to the number of elements in each lens design (12 in all 4 examples), we do not include these windows in the count. The use of these windows was necessitated by the application; however, the invention can be without the above-mentioned windows or without the above-mentioned block of glass when used in other applications.

The invention has been described in detail with particular reference to four presently preferred embodiments, but it will be understood that variations and modifications can be effected within the spirit and scope of the invention. For example, instead of an external cemented doublet component, an external cemented triplet component may be used.

While in the embodiments specifically described above, all of the surfaces are spherical, it is to be understood that other embodiments of this invention may have nonspherical surfaces.

Similarly, it should be understood that the focal length, or the track length and other system parameters of the illustrative embodiments can be scaled up or down for different applications. Changes in field coverage or in magnification can also be accommodated by utilizing the design parameters.

The lens systems according to the present invention are not restricted for use in a high definition telecine film scanner, but can be used for other applications requiring a good quality lens system.

This invention has been described above in terms of particular examples, using glass types which are commercially available. These particular examples are only illustrative of the invention, as it is possible for a skilled lens designer to find other combinations of glasses to satisfy the particular requirements of an application. The invention is defined more generally by the following claims and their equivalents.

What is claimed is:

1. A lens system comprising two groups of lens components and an aperture stop located between said two groups of lens components, said two groups of lens components arranged in the basic double gauss configuration; and an additional component located on the outside of said two groups of lens components, said additional component comprising a positive lens element and a negative lens element, said positive element and said negative element forming an interface, said interface being of negative optical power, wherein the index of refraction of said negative lens element is greater than that for said positive lens element,— with the difference of refractive index $\Delta N$ being $0.14 < \Delta N < 0.31$.

2. The lens system according to claim 1 and wherein said negative lens element is located towards the exterior of the lens system.

3. The lens system according to claim 2 and wherein said additional component is located on the short conjugate side of the lens system.

4. The lens system according to claim 2 and wherein said additional component is a doublet component.

5. The lens system according to claim 3 and wherein said additional component is a doublet component.

6. The lens system according to claim 2 and wherein said positive element is cemented to said negative lens element forming a cemented interface, said cemented interface being negative in optical power.

7. The lens system according to claim 3 and wherein said positive lens element is cemented to said negative lens element forming a cemented interface, said cemented interface being negative in optical power.

8. The lens system according to claims 1, 5, or 7 and wherein said additional component is located on the short conjugate side of the lens system.

9. The lens system according to claim 5 and wherein said positive lens element has a convex rear surface and said negative lens element has a concave front surface.

10. A lens system according to claim 2, 3, or 4 wherein said lens system has several lens elements made of optical materials having abnormal relative partial dispersions so as to obtain superior color correction.

11. A lens system according to claim 8, and wherein said lens system has several lens elements made of optical materials having abnormal relative partial dispersions so as to obtain superior color correction.

12. A lens system according to claim 2, 3, or 4 wherein said lens system has more than half of the lens elements made of optical materials which have abnormal relative partial dispersions in order to produce an apochromatic color correction.

13. A lens system according to claim 1 and wherein the radii of the surfaces, the thicknesses of the elements and the optical materials are being as follows:

| RADIUS (mm) | THICK-NESS (mm) | GLASS TYPE (BLANK = AIR) | CAT-ALOG | NAME |
|---|---|---|---|---|
| INFINITY | 30.00 | | | |
| INFINITY | 34.00 | 517642 | BK7 | (SCHOTT) |
| INFINITY | 49.56 | | | |
| INFINITY | 6.00 | 517642 | BK7 | (SCHOTT) |
| INFINITY | 1.00 | | | |
| 65.1231 | 9.11 | 586610 | LGSK2 | (SCHOTT) |
| −153.0320 | 0.90 | | | |
| 51.9944 | 10.43 | 586610 | LGSK2 | (SCHOTT) |
| −67.5236 | 4.05 | 613443 | KZFSN4 | (SCHOTT) |
| 126.8860 | 0.90 | | | |
| 29.9767 | 8.47 | 487845 | FK51 | (SCHOTT) |
| −161.9230 | 6.71 | 682482 | LAF20 | (SCHOTT) |
| 17.0410 | 5.91 | | | |
| APERTURE STOP | 5.91 | | | |
| −18.9197 | 3.00 | 613443 | KZFSN4 | (SCHOTT) |
| 45.7245 | 9.07 | 586610 | LGSK2 | (SCHOTT) |
| −28.3964 | 0.94 | | | |
| −78.6332 | 4.00 | 613443 | KZFSN4 | (SCHOTT) |
| 30.3167 | 14.88 | 586610 | LGSK2 | (SCHOTT) |
| −62.5651 | 0.98 | | | |
| 71.9300 | 11.72 | 586610 | LGSK2 | (SCHOTT) |
| −56.7590 | 19.04 | | | |
| 77.1517 | 18.55 | 547536 | BALF5 | (SCHOTT) |
| −26.8715 | 16.87 | 720504 | LAK10 | (SCHOTT) |
| 82.2018 | 5.00 | | | |
| INFINITY | 8.00 | 517642 | BK7 | (SCHOTT) |
| INFINITY | 15.00 | | | |
| INFINITY | 0.00 | | | |

*Glasses with abnormal relative partial dispersions

14. A lens system according to claim 1 and wherein the radii of the surfaces, the thicknesses of the elements and the optical materials are as follows:

| RADIUS (mm) | THICK-NESS (mm) | GLASS TYPE (BLANK = AIR) | CAT-ALOG | NAME |
|---|---|---|---|---|
| INFINITY | 30.00 | | | |
| INFINITY | 29.05 | 517642 | BK7 | (SCHOTT) |
| INFINITY | 48.58 | | | |
| INFINITY | 4.00 | 517642 | BK7 | (SCHOTT) |
| INFINITY | 6.00 | | | |
| −37.5865 | 5.00 | 654396 | KZFSN5 | (SCHOTT) |
| 80.1994 | 9.88 | 501564 | K10 | (SCHOTT) |
| −51.1244 | 1.00 | | | |
| 103.021 | 8.70 | 586610 | LGSK2 | (SCHOTT) |
| −76.5635 | 1.33 | | | |
| 56.9611 | 10.05 | 586610 | LGSK2 | (SCHOTT) |
| 117.738 | 1.00 | | | |
| 47.9976 | 7.83 | 487845 | FK51 | (SCHOTT) |
| −77.4080 | 1.43 | | | |
| −72.1304 | 9.87 | 558542 | KZFSN1 | (SCHOTT) |
| 28.3067 | 2.86 | | | |
| APERTURE STOP | 2.86 | | | |
| −28.3067 | 9.87 | 558542 | KZFSN2 | (SCHOTT) |
| 72.1304 | 1.43 | | | |
| 77.4080 | 7.83 | 487845 | FK51 | (SCHOTT) |
| −47.9976 | 1.00 | | | |
| −148.567 | 5.56 | 586610 | LGSK2 | (SCHOTT) |
| −59.4914 | 1.11 | | | |
| 71.0150 | 12.71 | 586610 | LGSK2 | (SCHOTT) |
| −111.360 | 7.50 | | | |
| 43.2192 | 10.00 | 501564 | K10 | (SCHOTT) |
| −66.2266 | 9.16 | 654396 | KZFSN5 | (SCHOTT) |
| 31.7598 | 6.00 | | | |
| INFINITY | 4.00 | 517642 | BK7 | (SCHOTT) |
| INFINITY | 44.40 | | | |
| INFINITY | 0.00 | | | |

15. A lens system according to claim 1 and wherein the radii of the surfaces, the thicknesses of the elements and the optical materials are as follows:

| RADIUS (mm) | THICK-NESS (mm) | GLASS TYPE (BLANK = AIR) | CAT-ALOG | NAME |
|---|---|---|---|---|
| INFINITY | 30.00 | | | |
| INFINITY | 29.05 | 517642 | BK7 | (SCHOTT) |
| INFINITY | 45.92 | | | |
| INFINITY | 4.00 | 517642 | BK7 | (SCHOTT) |
| INFINITY | 6.00 | | | |
| −42.2210 | 9.93 | 788474 | LASF014 | (OHARA) |
| 59.9993 | 11.11 | 586610 | LGSK2 | (SCHOTT) |
| −58.3798 | 0.50 | | | |
| 62.1033 | 10.20 | 586610 | LGSK2 | (SCHOTT) |
| −79.8413 | 0.53 | | | |
| 73.2211 | 5.40 | 586610 | LGSK2 | (SCHOTT) |
| 141.494 | 0.50 | | | |
| 31.2365 | 9.98 | 487845 | FK51 | (SCHOTT) |
| −137.290 | 6.33 | 734515 | LAK09 | (OHARA) |
| 25.2015 | 5.16 | | | |
| (APERTURE STOP) | 5.16 | | | |
| −25.2015 | 6.33 | 734515 | LAK09 | (OHARA) |
| 137.290 | 9.98 | 487845 | FK51 | (SCHOTT) |
| −31.2365 | 0.50 | | | |
| −1117.00 | 5.73 | 586610 | LGSK2 | (SCHOTT) |
| −92.1109 | 0.50 | | | |
| 58.8936 | 9.64 | 586610 | LGSK2 | (SCHOTT) |
| −79.8413 | 4.85 | | | |
| 50.6343 | 10.71 | 586610 | LGSK2 | (SCHOTT) |
| −48.0574 | 15.00 | 788474 | LASFO14 | (OHARA) |
| 32.2625 | 6.00 | | | |
| INFINITY | 4.00 | 517642 | BK7 | (SCHOTT) |
| INFINITY | 46.98 | | | |
| INFINITY | 0.00 | | | |

*Glasses with abnormal relative partial dispersion

16. A lens system according to claim 1 and wherein the radii of surfaces, the thickness of the elements and the optical materials are as follows:

| RADIUS (mm) | THICK-NESS (mm) | GLASS TYPE (BLANK = AIR) | CAT-ALOG | NAME |
|---|---|---|---|---|
| INFINITY | 30.00 | | | |
| INFINITY | 29.05 | 517642 | BK7 | (SCHOTT) |
| INFINITY | 32.83 | | | |
| INFINITY | 4.00 | 517642 | BK7 | (SCHOTT) |
| INFINITY | 6.00 | | | |
| −60.56270 | 15.00 | 881410 | LASFN31 | (SCHOTT) |
| 115.88460 | 1.00 | | | |
| 107.93970 | 10.96 | 586610 | LGSK2 | (SCHOTT) |
| −65.77260 | 1.00 | | | |
| 138.93100 | 12.32 | 586610 | LGSK2 | (SCHOTT) |
| −138.93100 | 1.00 | | | |
| 73.23340 | 6.92 | 586610 | LGSK2 | (SCHOTT) |
| 311.93580 | 5.55 | | | |
| 35.45850 | 10.09 | 487845 | FK51 | (SCHOTT) |
| −94.92920 | 1.01 | | | |
| −90.98260 | 5.62 | 558542 | KZFSN2 | (SCHOTT) |
| 26.54090 | 4.61 | | | |
| (APER-TURE STOP) | 4.40 | | | |
| −28.51400 | 7.96 | 558542 | KZFSN2 | (SCHOTT) |
| 82.35970 | 1.50 | | | |
| 90.75350 | 10.05 | 487845 | FK51 | (SCHOTT) |
| −38.22780 | 5.06 | | | |
| 875.95620 | 7.18 | 586610 | LGSK2 | (SCHOTT) |
| −87.34010 | 1.00 | | | |
| 74.72870 | 8.07 | 586610 | LGSK2 | (SCHOTT) |
| −268.60470 | 1.00 | | | |
| 41.07060 | 9.59 | 586610 | LGSK2 | (SCHOTT) |
| −203.60640 | 1.00 | | | |
| −256.90180 | 11.36 | | LASFN31 | (SCHOTT) |
| 29.09140 | 6.00 | | | |
| INFINITY | 4.00 | 517642 | BK7 | (SCHOTT) |
| INFINITY | 44.884 | | | |
| INFINITY | 0.00 | | | |

*Glasses with abnormal relative partial dispersion

17. A lens system comprising two groups of lens components and an aperture stop located between said two groups of lens components, said two groups of lens components arranged in the basic double gauss configuration; and
   an additional cemented component located on the outside of said two groups of lens components, said additional component comprising a positive lens element cemented to a negative lens element forming a cemented interface, said cemented interface being negative in optical power, wherein the refractive index difference between the two optical materials is at least 0.14.

18. The lens system according to claim 17, wherein said difference in refractive index ($\Delta N$) is $0.14 < \Delta N < 0.31$.

19. The lens system according to claim 17, wherein said cemented component is located on he short conjugate side of the lens system.

20. A lens system according to claim 17 and wherein said lens system has several lens elements made of optical materials which have abnormal relative partial dispersions to produce an apochromatic color correction.

21. A lens system according to claim 17 wherein said additional cemented component is a cemented doublet component.

22. An apochromatic lens system comprising two groups of lens components and an aperture stop located between said two groups of lens components, said two groups of lens components arranged in the basic double gauss configuration;
   a first doublet component located in front of said two groups of lens components; and
   a second doublet component located at the rear of said two groups of lens components, wherein said first and said second doublet components each is comprised of a positive lens element located towards the interior of the lens system and a negative lens element located towards the exterior of the lens system, and wherein the interface between the two lens elements of each doublet component is negative in optical power.

23. A lens system comprising from front to back a first external doublet component, including a negative lens element and a positive lens element;
   a biconvex lens component;
   a meniscus lens component;
   an internal doublet having a lens element with a concave surface oriented towards an aperture stop; an aperture stop;
   an internal doublet lens having a lens element with a concave surface oriented towards the aperture stop;
   a meniscus lens component;
   a biconvex lens component; and
   a doublet including a positive lens element and a negative lens element.

24. A lens system according to claim 23, and wherein both of said internal doublets are uncemented and they are comprised of positive and negative lens elements.

25. A lens system according to claim 24, and wherein both of said internal doublets are cemented doublets and they are comprised of positive and negative lens elements cemented together.

26. A lens system comprising from front to back a first external cemented doublet lens component, including a negative biconcave lens element and a positive biconvex lens element;
   a single biconvex lens element;
   a single meniscus lens element;
   a first internal cemented doublet lens component having a concave surface oriented towards an aperture stop; an aperture stop;
   a second internal cemented doublet lens component having a concave surface oriented towards the aperture stop;
   a single meniscus lens element;
   a biconvex lens element; and
   a second external cemented doublet lens component including a positive biconvex lens element and a negative biconcave lens element.

27. A lens system comprising from front to back a first external cemented doublet lens component, including a negative biconcave lens element and a positive biconvex lens element;
   a single biconvex lens element;
   a single meniscus lens element;
   a single biconvex positive lens element;
   a single negative lens element having a concave surface towards an aperture stop; an aperture stop;
   a single negative lens element having a concave surface oriented towards an aperture stop;
   a single biconvex lens element;
   a single meniscus lens element;
   a biconvex lens element; and